(12) United States Patent
Wang

(10) Patent No.: US 6,732,847 B1
(45) Date of Patent: May 11, 2004

(54) SHIFT-BY-WIRE SHIFTER ASSEMBLY WITH MECHANICAL OVERRIDE

(75) Inventor: Yong Qiang Wang, Rochester Hills, MI (US)

(73) Assignee: Dura Global Technologies, Inc., Rochester Hills, MI (US)

( * ) Notice: Subject to any disclaimer, the term of this patent is extended or adjusted under 35 U.S.C. 154(b) by 0 days.

(21) Appl. No.: 10/163,396

(22) Filed: Jun. 5, 2002

(51) Int. Cl.[7] .................. F16H 59/02; B60K 20/04; B60K 41/26
(52) U.S. Cl. .................. 192/220.4; 74/473.12; 74/473.15; 74/473.18
(58) Field of Search .............. 192/220.4, 220.7; 74/335, 473.12, 473.15, 473.18

(56) References Cited

U.S. PATENT DOCUMENTS

| | | | | |
|---|---|---|---|---|
| 4,912,997 A | * | 4/1990 | Malcolm et al. | 74/335 |
| 5,036,962 A | * | 8/1991 | Amagasa | 70/251 |
| 5,062,314 A | * | 11/1991 | Maier et al. | 74/473.18 |
| 5,924,540 A | * | 7/1999 | Kim | 192/220.4 |
| 6,259,980 B1 | * | 7/2001 | Peck et al. | 701/24 |
| 6,378,393 B1 | * | 4/2002 | Bates | 74/473.18 |
| 6,382,046 B1 | * | 5/2002 | Wang | 74/473.15 |

* cited by examiner

*Primary Examiner*—Richard M. Lorence
(74) *Attorney, Agent, or Firm*—Peter D. McDermott; Casimer R. Kiczek

(57) ABSTRACT

A shift-by-wire shifter assembly is provided. The shift-by-wire shifter assembly includes a shift lever, a sensor, a cable bracket, and a lever lock. The shift lever is movable between shift position locations. The sensor is operative to detect the shift position of the shift lever and generate an electrical signal corresponding to the shift position location of the shift lever. The cable bracket has a transmission shift cable mount. The lever lock is operative in a first condition to releasably interlock the shift lever to the cable bracket for movement of the cable bracket with the shift lever between shift position locations, and has a second condition in which the shift lever is movable between shift position locations independently of the cable bracket.

20 Claims, 11 Drawing Sheets

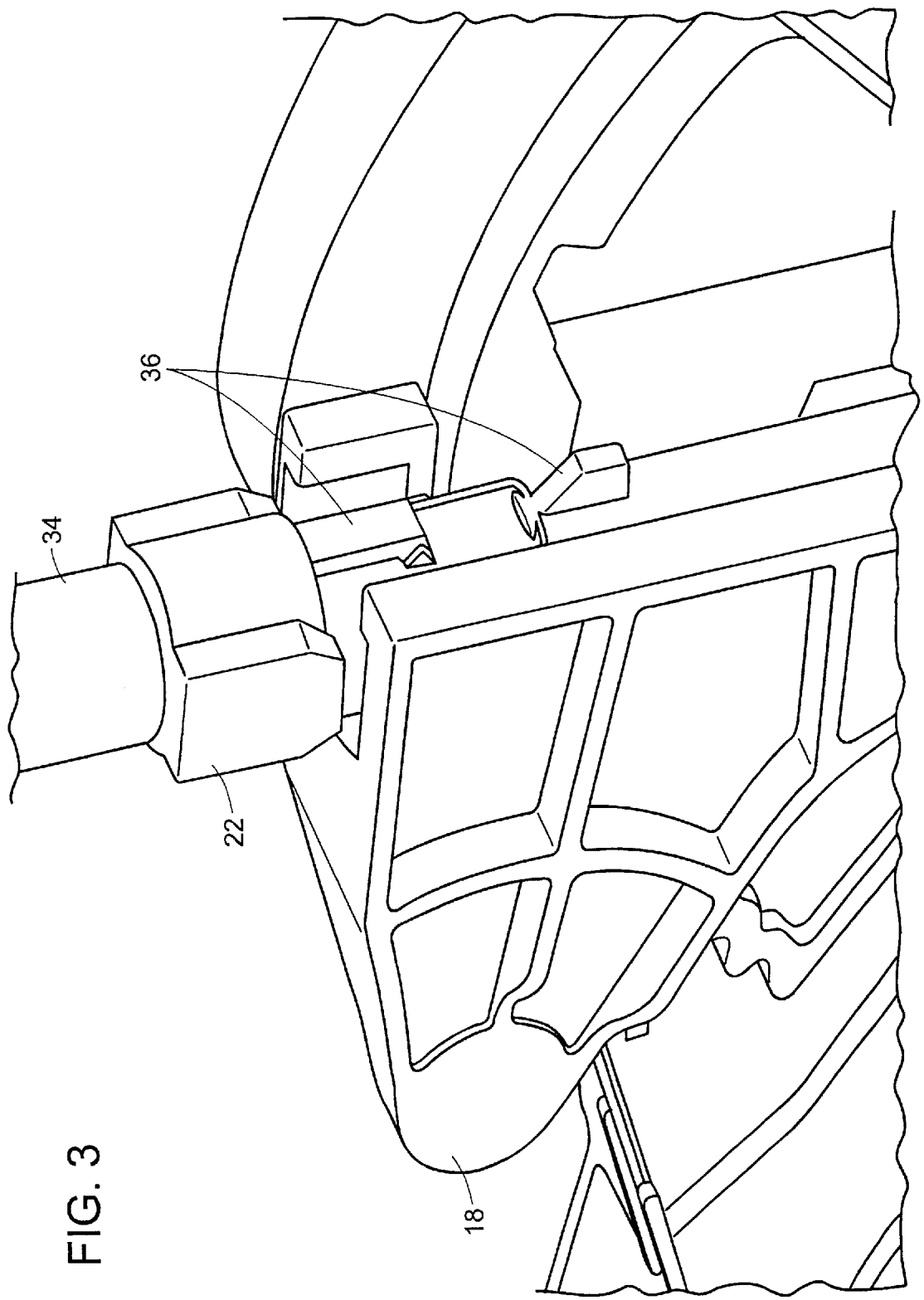

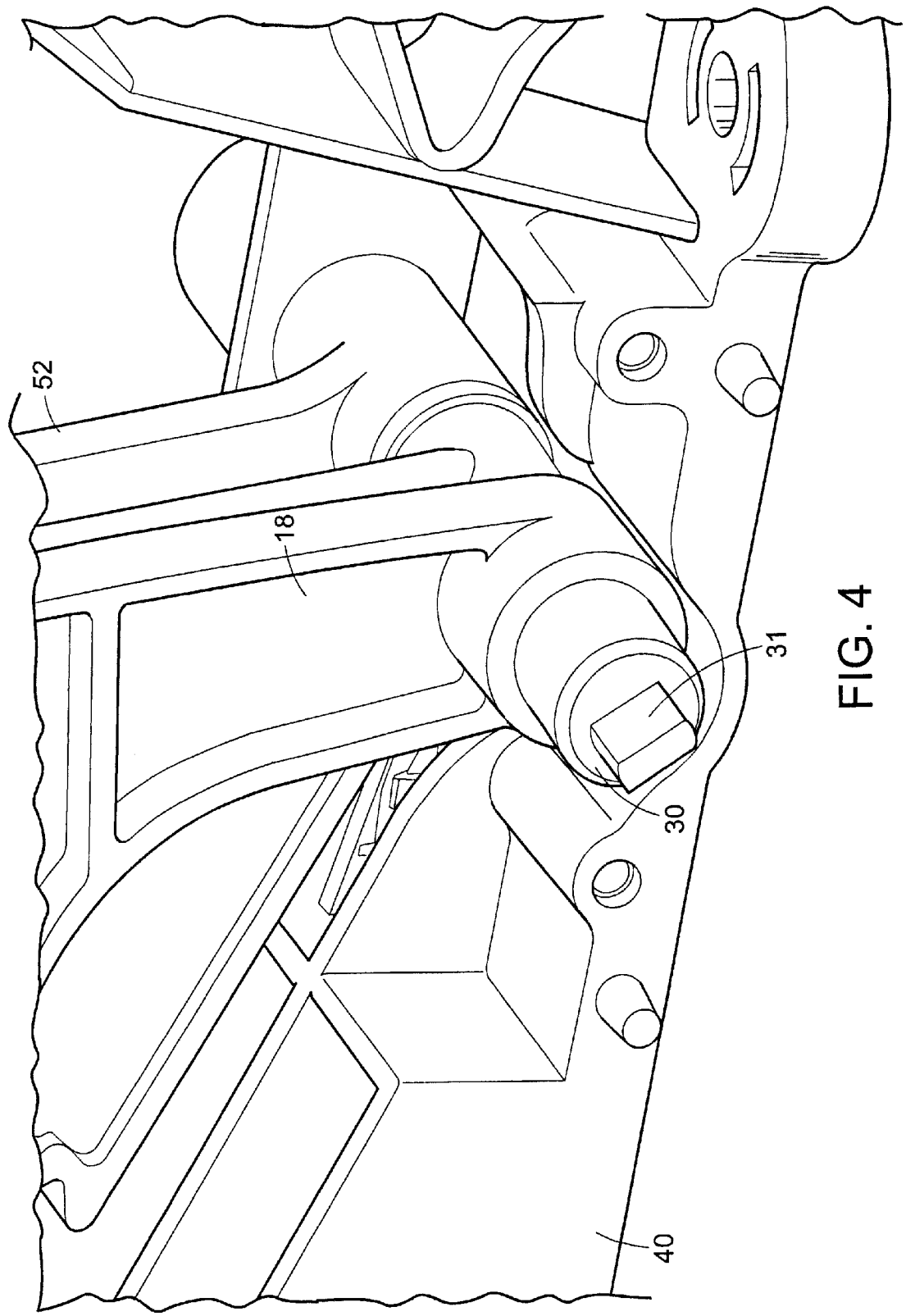

SHIFT-BY-WIRE SHIFTER ASSEMBLY WITH MECHANICAL OVERRIDE

FIELD OF THE INVENTION

The present invention relates generally to transmission shifting systems and more particularly to electronic shifter assemblies.

BACKGROUND OF THE INVENTION

Modern automotive vehicles having automatic transmissions typically employ a driver-operated mechanical shifter assembly which controls the transmission. Such shifters generally employ a shift lever which may be moved by hand between several gear settings, the lever typically being mounted for rotation about a pivot point. While such systems are widely used, several drawbacks have been noted.

To eliminate these drawbacks associated with mechanical shifter assemblies, it is proposed that an electronic shifter assembly be used to shift the transmission into a desired gear setting. The electronic shifter does not use the traditional mechanical transmission cable to physically shift gears but rather transmits an electric signal to an electronic control box that actuates the shifting. This type of electronic shifting system is often referred to as "shift-by-wire."

A drawback with conventional electronic shift systems is the potential loss of transmission control when there is a power, electrical, or system failure. That is, the operator could lose the ability to shift gears. This could cause the inability to even shift the automobile into neutral in order to enable the automobile to be towed.

It is an object of the present invention, to provide a shift-by-wire shifter assembly with mechanical override.

SUMMARY

In accordance with a first aspect, a shift-by-wire shifter assembly comprises a shift lever, a sensor, a cable bracket, and a lever lock. The lever is movable between shift position locations. The sensor is operative to detect the shift position location of the lever and generate an electrical signal corresponding to the shift position location of the shift lever. The cable bracket has a transmission shift cable mount, typically operative to receive the end fitting of a transmission shift cable or the like. The lever lock is operative in a first condition to releasably interlock the shift lever to the cable bracket for movement of the cable bracket with the shift lever between shift position locations, and has a second condition in which the shift lever is movable between shift position locations independently of the cable bracket.

In accordance with a second aspect, a shift-by-wire shifter assembly comprises a housing, a shift lever, a sensor, a cable bracket, and a sleeve. The shift lever is pivotally mounted to the housing and moveable between shift position locations. Typically, the lever extends from an upper portion of the housing and is operative to move through a series of shift positions locations corresponding to transmission settings. The sensor is attached to the housing and operative to detect the shift position location of the shift lever and to generate an electrical signal corresponding to the shift position location of the shift lever. The cable bracket is pivotally mounted to the housing and is configured to receive the shift lever. In a first condition the cable bracket moves with the shift lever through the various shift position locations and mechanically controls the transmission via the transmission shift cable. In a second condition the cable bracket does not move with the shift lever and it is the signal generated by the sensor that controls the transmission. The sleeve is slidable along at least a portion of the length of the shift lever and configured to engage the shift lever to the cable bracket for movement of the cable bracket with the shift lever between shift position locations. In a typical embodiment the sleeve is slid toward the end of the shift lever pivotally mounted in the housing to engage the shift lever with the cable bracket in the first condition wherein the cable bracket moves with the shift lever. The sleeve is slid away from the pivot mount of the lever to place the cable bracket in the second condition wherein the cable bracket does not move with the shift lever.

In accordance with another aspect, a shift-by-wire shifter assembly comprises a base, a yoke sub-assembly, a shift lever, a sensor, a cable bracket, a lever lock, components of a brake transmission interlock (BSTI) system, and a shifter knob. The yoke subassembly comprises detents corresponding to shift position locations and a pivot pin for pivotally mounting the yoke sub-assembly to the base. The shift lever is attached to the yoke sub-assembly. The sensor is attached to the base and operative to detect the shift position location of the shift lever and to generate an electrical signal corresponding to the shift position location of the shift lever. The cable bracket is pivotally mounted on the pivot pin of the yoke sub-assembly and has a transmission shift cable mount, typically operative to receive a transmission shift cable. The lever lock comprises a sleeve slidable along at least a portion of the length of the shift lever and is operative in a first condition to releasably interlock the shift lever to the cable bracket for movement of the cable bracket with the shift lever between shift position locations, and has a second condition in which the shift lever is movable between shift position locations independently of the cable bracket. The components of a brake transmission interlock system include at least a BTSI lever pivotally mounted on the pivot pin of the yoke sub-assembly and a solenoid in communication with the BTSI lever. The shifter knob is mounted on a free end of the shift lever opposite of the yoke sub-assembly and operative to operate the lever lock.

BRIEF DESCRIPTION OF THE DRAWINGS

Certain preferred embodiments are described below with reference to the accompanying figures in which:

FIG. 3 is an enlarged view of a preferred embodiment of the shifter assembly of FIGS. 1–2 showing the interaction of the shift lever, cable bracket and lever lock of the claimed shifter assembly.

FIG. 4 is an enlarged view of the pivot pin of the yoke sub-assembly of a preferred embodiment of the shifter assembly of FIGS. 1–2.

Figure 1:
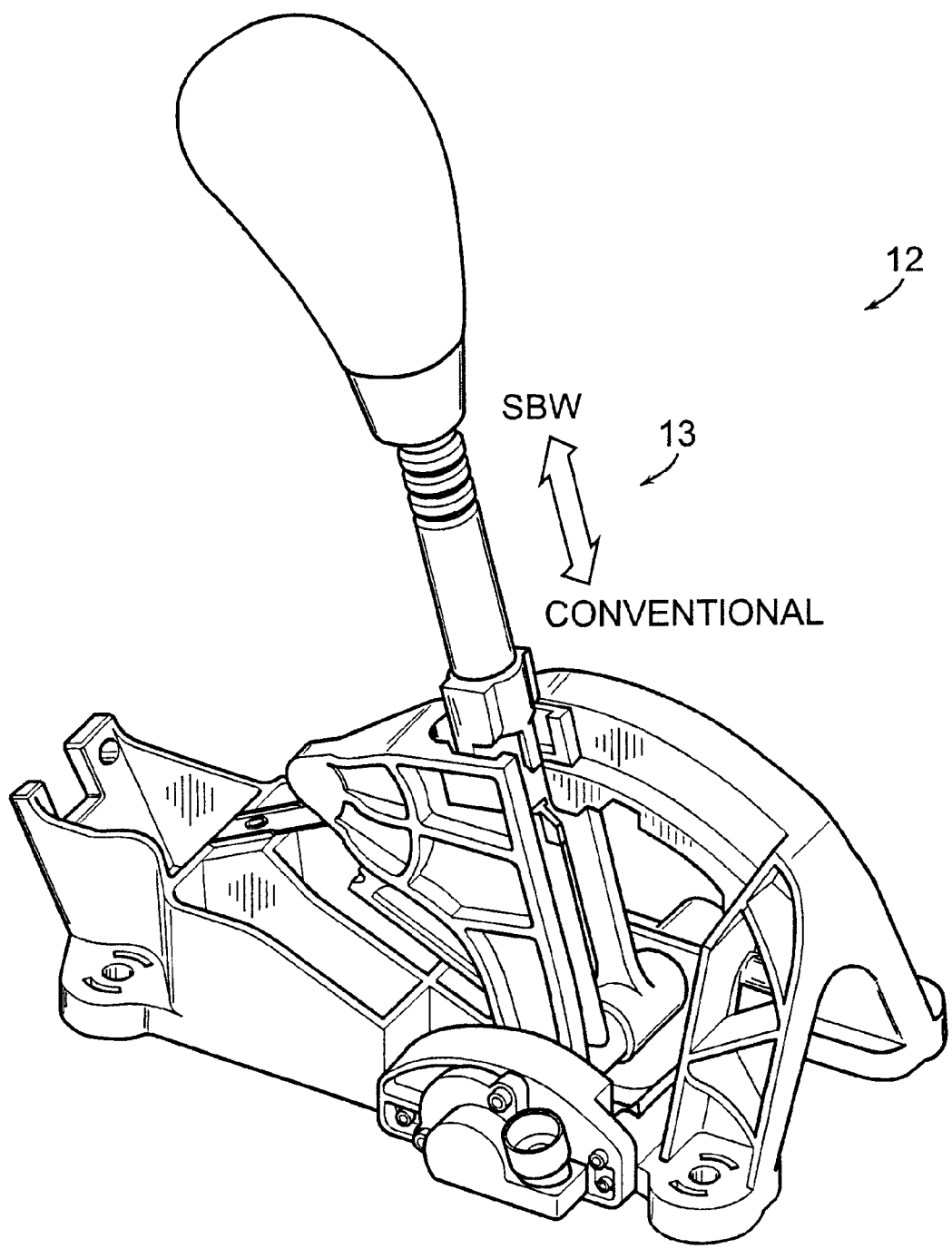
FIG. 1 is a perspective view of an assembled preferred embodiment of the claimed shift-by-wire (SBW) shifter assembly showing how the operator switches between the mechanical or conventional mode and the electronic (SBW) mode of shifting.

It should be understood that the appended drawings are not necessarily to scale, presenting a somewhat simplified representation of various preferred features illustrative of the basic principles of the invention. The specific design features of the transmission shifter as disclosed here, including, for example, specific dimensions of the detent surfaces and the pivot block will be determined in part by the particular intended application and use environment. Certain features of the illustrated embodiments have been enlarged or distorted relative to others to facilitate visualization and clear understanding. In particular, thin features may be thickened, for example, for clarity of illustration. All references to direction and position, unless otherwise indicated, refer to the orientation of the transmission shifter illustrated in the drawings. In general, front or forward refers to the direction of the shifter lever as it moves toward the Park position shown in the drawings, and rear, rearward or backwards refers to a direction of the shifter lever as it moves away from the Park position.

DETAILED DESCRIPTION OF CERTAIN PREFERRED EMBODIMENTS

It will be apparent to those skilled in the art, that is, to those who have knowledge or experience in this area of technology, that many uses and design variations are possible for the transmission shifter disclosed here. The following detailed discussion of various alternative and preferred features and embodiments will illustrate the general principles of the invention with reference to a transmission shifter for use in controlling the transmission of a motor vehicle. Other embodiments suitable for other applications will be apparent to those skilled in the art given the benefit of this disclosure.

Referring to FIG. 1 there is shown an assembled embodiment of a shift-by-wire assembly 12 with mechanical override. This figures shows how an operator of the shifter engages either the shift-by-wire (SBW) mode, wherein the transmission (not shown) is actuated by electronic signals generated by the shifter assembly 12; or in mechanical mode, wherein the transmission is actuated mechanically by a transmission shift cable interconnecting the shifter assembly 12 and the transmission (not shown). The mechanical mode operates in a manner corresponding generally to conventional automatic transmission shifters. In this preferred embodiment pushing in a downward direction on the shifter as indicated by the arrow 13 engages the mechanical or conventional mode of operation. Pulling up on the shifter as indicated by the arrow 13 engages the electronic shifting mode. In this particular embodiment the mechanical or conventional mode can only be engaged while the shifter is in the park position. The pushing down and pulling up of the shifter moves a sleeve so as to engage or disengage mechanical override shifting. The sleeve only lines up properly to engage the bracket connecting to the transmission shift cable when the shifter is in an orientation corresponding to the gear park. This is a safety feature to prevent accidental engagement of mechanical mode. Further description of the operation of the shifter assembly can be found herein below.

Figure 2:
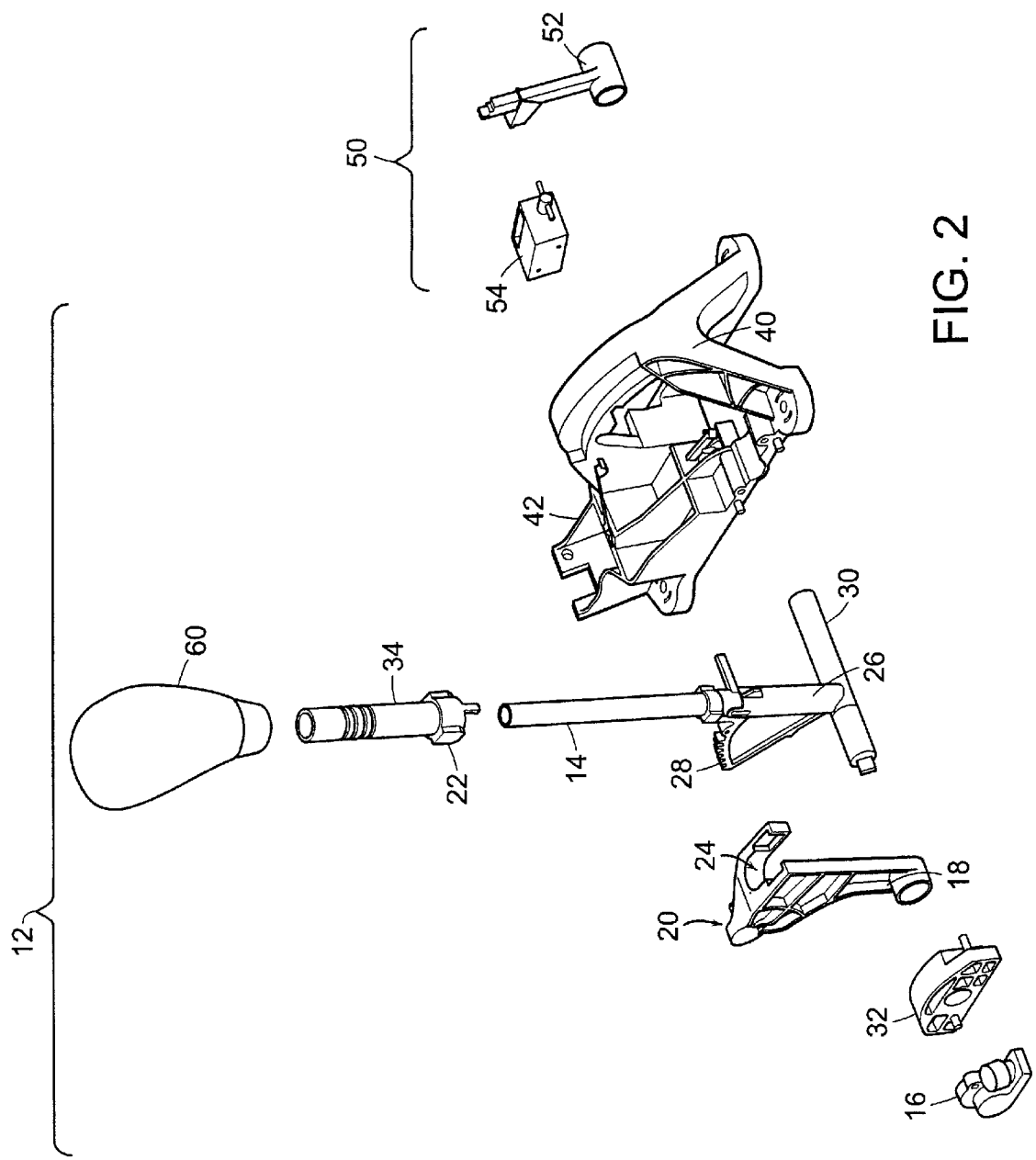
FIG. 2 is an exploded perspective view of a preferred embodiment of the claimed shifter assembly of FIG. 1.

Referring now to FIG. 2, in accordance with certain preferred embodiments, a shift-by-wire shifter assembly 12 includes a shift lever 14 movable between shift position locations, a sensor 16 operative to detect the shift position location of the shift lever 14 and to generate an electrical signal corresponding to the shift position location of the shift lever 14, a cable bracket 18 having a transmission shift cable mount 20, and a lever lock 22 operative in a first condition to releasably interlock the shift lever 14 to the cable bracket 18 for movement of the cable bracket 18 with the shift lever 14 between shift position locations, and operative in a second condition in which the shift lever 14 is movable between shift position locations independently of the cable bracket 18.

In certain embodiments the shift lever 14 is of a type typically found in floor-mounted, dash-mounted, or center-console automatic shifter assemblies used in numerous automobiles. In certain preferred embodiments the shift lever 14 is movable around a pivot. Other suitable designs for the shift lever will be apparent to one skilled in the art given the benefit of this disclosure.

In certain embodiments the position signal produced by the sensor 16 is output to the automatic transmission assembly (not shown) where it is received by either the transmission control module or the electro-mechanical actuators, depending on the configuration of the vehicle. In other embodiments, the position signal produced by the sensor 16 can be output to a gear position indicator where it is received by either the transmission control module or the electromechanical actuators. A suitable actuator is described in commonly assigned U.S. application Ser. No. 10/161,259, entitled "Shift-by-wire Transmission Actuator Assembly," filed on May 31, 2002, the entire disclosure of which is incorporated herein by reference for all purposes. Other suitable control modules or actuators will be readily apparent to those skilled in the art, given the benefit of this disclosure. Suitable sensors include any sensor capable of detecting a change in position of the shift lever. In certain preferred embodiments the sensor 16 is a rotary sensor. In other embodiments the sensor 16 is a linear motion sensor such as a Hall effect sensor. The electronic signal produced by the sensor 16 may be analog or digital. In certain embodiments the signal produced by the sensor 16 may be optical. Other suitable sensors and configurations will be apparent to one skilled in the art given the benefit of this disclosure.

In certain preferred embodiments, each shift position location of the shift lever is a unique position (typically, a position relative to a fixed base or housing described further below) that corresponds to a particular gear or setting (or a transition between gears or settings) of the vehicle's transmission. For example, the shift position locations of the shift lever may correspond to the traditional gear positions of P (park), R (reverse), N (neutral), D (drive), and L (low). In other embodiments the shift lever may have shift position locations corresponding to shift transitions/actions, such as "up-shift" or "down-shift" to actuate the transmission through it's various settings. Other embodiments will be apparent to one skilled in the art given the benefit of this disclosure.

Figure 2A:
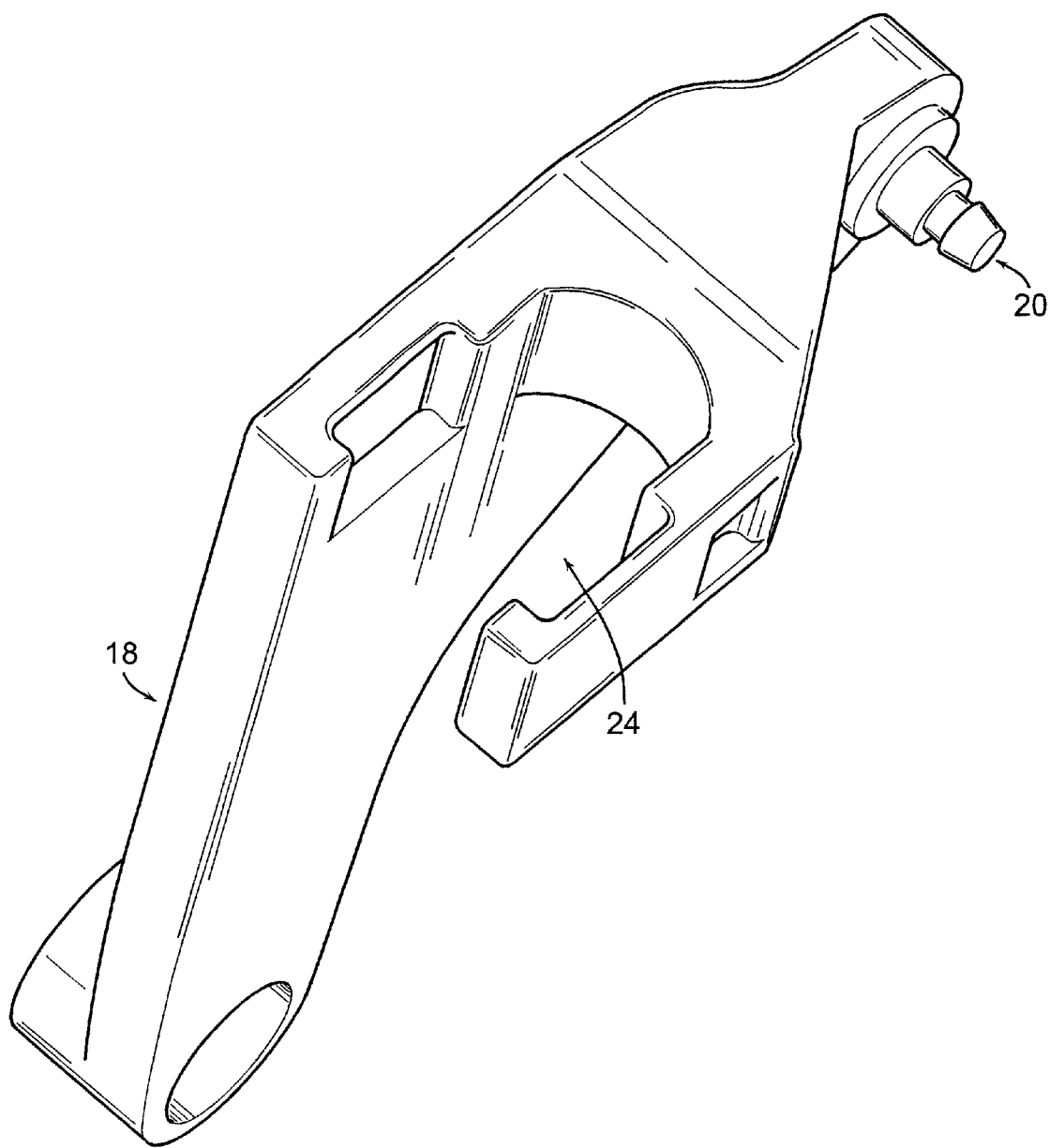
FIG. 2A is a cut away perspective view of a preferred embodiment of the cable bracket of FIG. 2.

The cable bracket 18 provides the mechanical linkage between the shift lever 14 and the transmission (not shown). The cable bracket 18 has a cable mount 20 configured for receiving a transmission shift cable. In certain preferred embodiments the cable mount 20 is a pin which is typically used in the automotive industry for connecting the transmission shift cable to the shifter assembly 12. The pin has a head portion, preferably an enlarged head portion, and a body portion. Between the head and body portions is a circumferentially-extending recess. In use, force exerted on the bracket 18 is transferred along the transmission shift cable to actuate control of the transmission. The cable bracket 18 is operative in a first condition to move with the shift lever 14 wherein the shift position location of the shift lever is conveyed by the cable bracket 18, moving with the shift lever 14, through the transmission shift cable to the transmission. In a second condition the cable bracket 18 does not move with the shift lever 14 and the transmission shift cable is not used to control the transmission. In certain preferred embodiments the cable bracket 18 is movable around a pivot. In certain preferred embodiments the cable bracket 18 has a recess 24 configured for receiving the shift lever 14. Examples of such configurations 24 include but are not limited to sockets, slots, pockets, and detents. The cable mount 20 and recess 24 of the cable bracket 18 can be better seen in FIG. 2A. In some embodiments the cable bracket 18 is molded plastic. Other embodiments will be apparent to those skilled in the art given the benefit of this disclosure The lever lock 22 is operative in a first condition to releasably interlock the shift lever 14 to the cable bracket 18 for movement of the cable bracket 18 with the shift lever 14 between shift position locations, and operative in a second condition in which the shift lever 14 is movable between shift position locations independently of the cable bracket 18. These conditions correspond to the aforesaid conditions of the cable bracket 18, i.e., moveable with the shift lever or not moveable with the shift lever.

In certain preferred embodiments the lever lock 22 slidably releasably interlocks the cable bracket 18 and the shift lever 14 for movement together between shift position locations. In certain embodiments the lever lock 22 is an annular sleeve 34 or ring mounted on the shift lever 14 and slidable along the length of the lever 14 as seen in FIG. 3. The lever lock 22 is put in a first condition by sliding the sleeve 34 down the lever 14 so as to engage the cable bracket 18 thereby interlocking the shift lever 14 and cable bracket 18. The second condition is achieved by pulling up the sleeve 34 so as to disengage the cable bracket 18 thereby allowing the shift lever 4 to move independent of the cable bracket 18.

In certain embodiments the lever lock 22 comprises a latch mechanism operative in an interlocking position to put the lever lock in the first condition. Examples of such latch mechanisms include but are not limited to pin-in-hole and tooth-engaging mechanisms as is well known in art.

Figure 9:
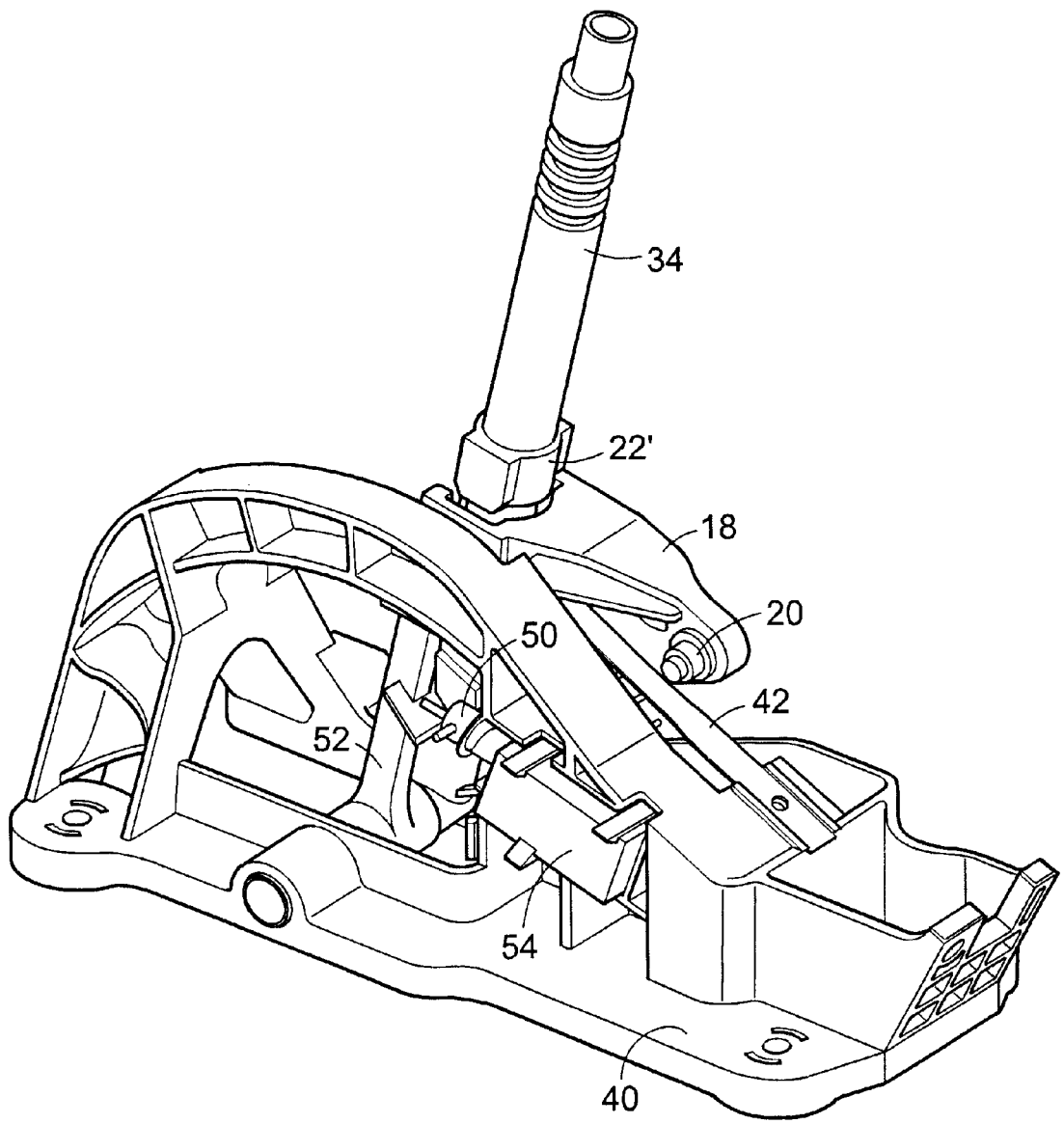
FIG. 9 is a perspective view of a shifted assembly similar to that of FIG. 5, wherein the lever lock comprises an electromagnetic lock.

In still other embodiments the lever lock 22 comprises an electromagnetic lock 22', as seen in FIG. 9, operative to transition the lever lock 22 from the second condition to the first condition when activated. In the first condition, when the electromagnet is activated, the shift lever 14 is effectively interlocked with the cable bracket 18 wherein moving the shift lever 14 also moves the cable bracket 18 and correspondingly actuates the transmission shift cable which in turn controls the transmission. In the second condition the electromagnet is deactivated and the shift lever 14 can move freely of the cable bracket 18.

In certain preferred embodiments the transmission shift cable is locked when the shifter is in electronic shift-by-wire mode so that the transmission shift cable and cable bracket attached to the transmission shift cable do not move thus preventing the mechanical functionality of the shifter from interfering with the electronic actuation of the transmission when the shifter is in shift-by-wire mode. Other embodiments will be apparent to one of skill in the art given the benefit of this disclosure.

As can be seen from this disclosure, when the lever lock 22, and correspondingly the cable bracket 18, is in the first condition the shifter is designed to operate as a traditional automatic transmission shifter. When the lever lock 22, and therefore the cable bracket 18, are in the second condition the shifter is designed to operate as an electronic "shift-by-wire" shifter. In certain embodiments it might be beneficial to include a feature that would cause the transmission to only be controlled by one method of operation of the shifter at a time. That is, when the lever lock 22 and cable bracket 18 are in the first condition such that the mechanical override mode of the shifter has been engaged and the transmission is being controlled via the transmission shift cable, the transmission should not also be controlled by the electronic signals received by the sensor 16. Accordingly, preferably, in the first condition of the lever lock the sensor is inoperative to detect the shaft position location of the shift lever or is inoperative to send a corresponding electronic signal, or the signal is otherwise rendered inoperative to actuate the transmission. One implementation of such a feature is a kill switch that deactivates the sensor 16 or sends and override command to the transmission control module or the electromechanical actuators when the lever lock 22 and cable bracket 18 are in the first condition and the mechanical override mode of the shifter has been engaged. Other suitable implementations will be apparent to one skilled in the art given the benefit of this disclosure.

Referring again to FIG. 2, in certain preferred embodiments, the shift-by-wire shifter assembly further includes a yoke sub assembly 26, attached to an end of the shift lever 14 that includes a series of detents 28 and a pivot pin 30. The yoke 26 provides the lever 14 with the operability of a traditional transmission shifter. The pivot pin 30 provides an axis for the lever 14 to rotate about. This provides the forward and backward movement through shift positions commonly found in prior art shifters. The series of detents 28 are often referred to as a "rooster comb." In certain embodiments these detents correspond to gear positions of the transmission, i.e. Park (P), Reverse (R), Neutral (N), Drive (D) and Low (L). These detents 28 also provide the "feel" of a traditional shifter as it moves through shift positions. An enlarged view of the pivot pin 30 of the yoke sub-assembly can be seen in FIG. 4. In the embodiment shown the pivot pin 30 has a blade 31 for engaging a rotary sensor. Suitable yoke sub-assemblies include any that would provide the above-mentioned functionality. Other yoke sub-assembly configurations will be apparent to one skilled in the art given the benefit of this disclosure.

In other embodiments wherein there is a pivot, the shift-by-wire shifter assembly further includes a pivot bearing block 32 mounting the sensor to the pivot. Other embodiments will be apparent to one skilled in the art given the benefit of this disclosure.

In certain embodiments, the lever lock 22 and shift lever 14 have corresponding surface configurations 36 adapted to releasably interlock with each other as shown in FIG. 3. An example of such an interlocking configuration is a snap-fit connection.

Figure 2B:
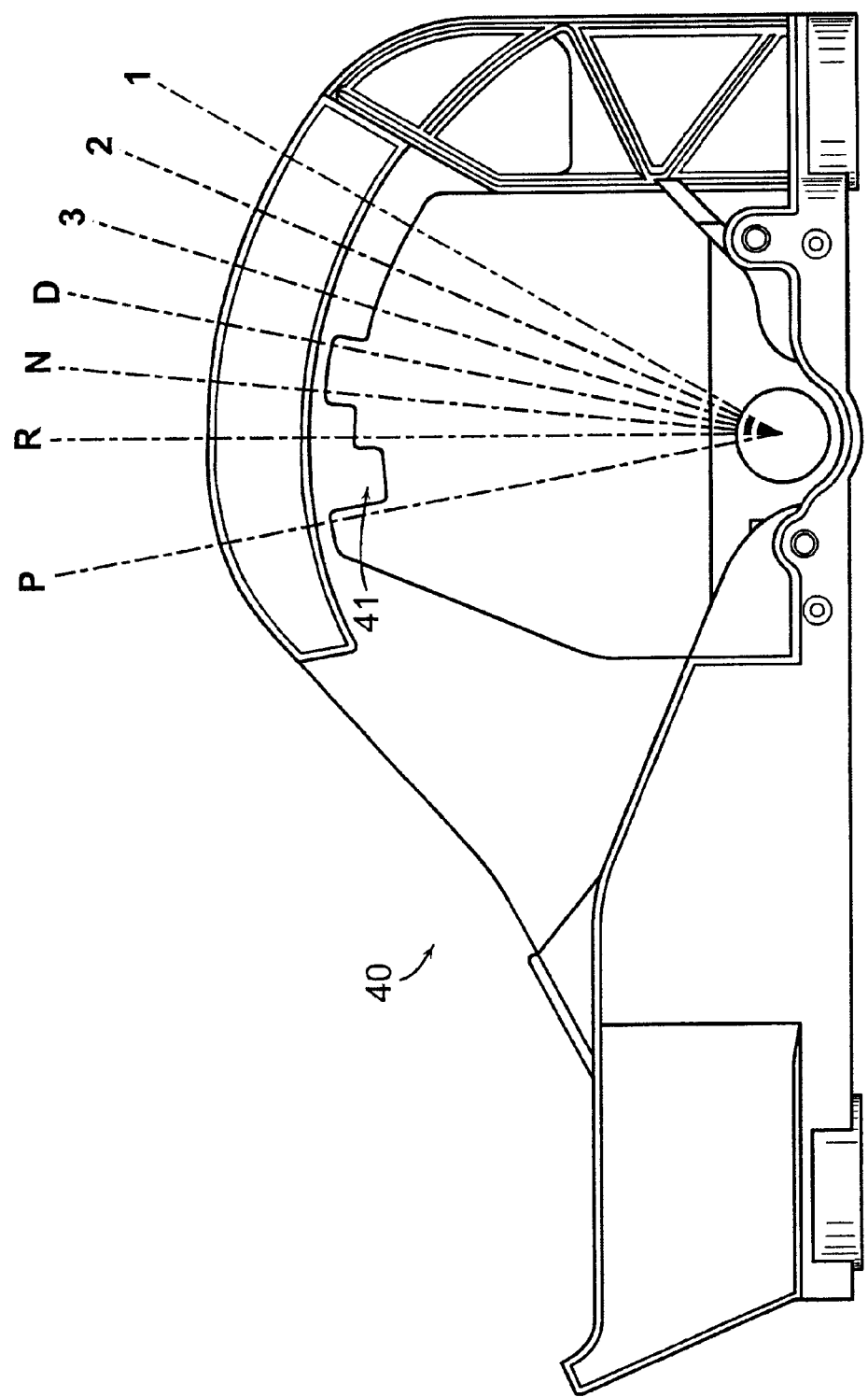
FIG. 2B is a wire frame schematic of a preferred embodiment of a base where the base is a housing.

In certain preferred embodiments the shift-by-wire shifter assembly also includes a base, wherein the shift lever, sensor and cable bracket of the shifter are mounted to the base. A specific embodiment of the base, wherein the base is a housing 40, can be seen in FIG. 2. The base serves at a mount that connects the other parts of the shifter assembly to the chassis of the automobile. The base may also include support features for other elements. In some embodiments, such as when the base is a housing 40, the base may partially or totally enclose the other parts of the shift assembly. In other embodiments the base has a plurality of transmission control positions. The transmission control positions, often referred to as a gate profile, may correspond to settings of the transmission, e.g. conventional transmission gear positions such a Park (P), Reverse (R), Neutral (N), Drive (D), and Low (L). A preferred embodiment of a base where the base is a housing with transmission control positions can be seen in FIG. 2B. Here the housing 40 has the transmission control positions or gate profile 41 corresponding to Park (P), Reverse (R), Neutral (N), Drive (D), Third gear (3), Second gear (2), and First gear (1). Referring back to FIG. 2, in embodiments where there is a yoke sub-assembly 26 as disclosed above, the base may have a spring leaf 42 to engage the detents 28 or "rooster comb" of the yoke sub-assembly 26 to provide delineable shift positions for the shift lever 14. Other embodiments will be apparent to one skilled in the art given the benefit of this disclosure.

In certain embodiments, the shift-by-wire shifter assembly also includes at least one component of a brake transmission interlock (BTSI) system 50. The brake transmission interlock (BTSI) system prevents the shifter from shifting out of Park position when the ignition switch is on unless the service brake is applied. Components of a brake transmission interlock system typically found in a shifter assembly comprise a BTSI lever 52 and solenoid 54. The lever 52 blocks the shifter from shifting out of park. The solenoid 54, when actuated, moves the lever out of the way of the shifter allowing the shifter to be shifted out of park. An example of such a brake transmission interlock (BTSI) system and its use can be seen in U.S. Pat. No. 5,314,049 which is hereby incorporated by reference for all purposes. Other embodiments will be apparent to one skilled in the art given the benefit of this disclosure.

Figure 5:
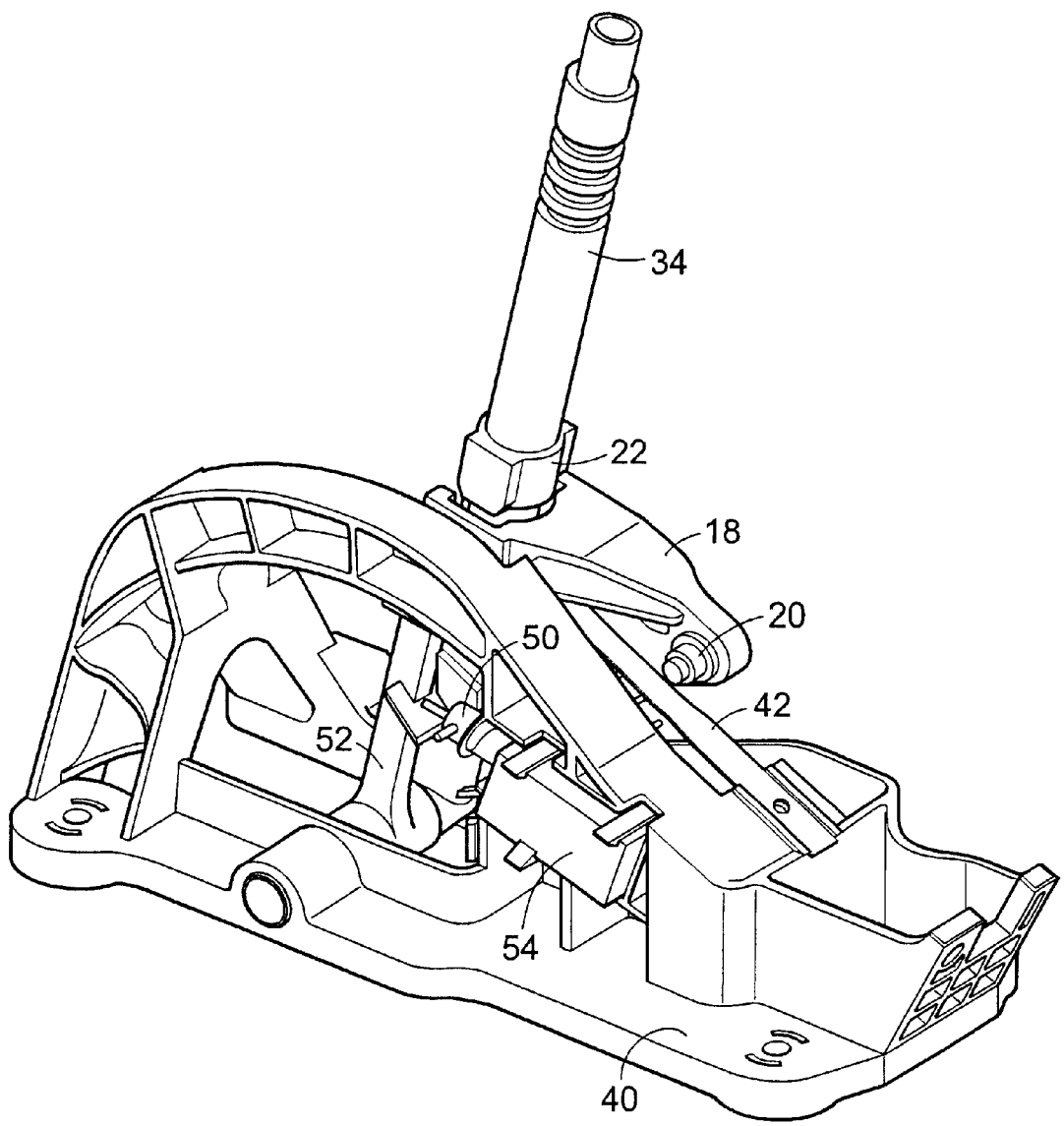
FIG. 5 is a perspective view of the opposite side of a preferred embodiment of the shifter assembly of FIGS. 1–2 showing the BTSI system.

FIG. 5 shows the opposite side of a preferred embodiment of an assembled shifter assembly. Viewable more clearly from this perspective are the components of a BTSI system 50, including the BTSI lever 52 and solenoid 54; the cable mount 20 of the cable bracket 18; and the spring leaf 42 on the base, for engaging the detents 28 of the yoke sub-assembly 26 (as seen in FIG. 2).

In other embodiments, the shift-by-wire shifter assembly also includes a shifter knob 60 at a free end of the shift lever 14. In certain embodiments the shifter knob 60 has a mechanical actuator operative to transition the lever lock 22 between it's first and second condition. In some embodiments this may be a push button that electronically controls the lever lock. In other embodiments, wherein the lever lock 22 is a sleeve 34, pushing down on the shifter knob slides the sleeve down the lever 14 so as to engage the cable bracket 18 placing the lever lock 22 in the first condition. Other embodiments will be apparent to one skilled in the art given the benefit of this disclosure.

In accordance with certain preferred embodiments shown in FIGS. 1–5, a shift-by-wire shifter assembly 12 includes a base (more specifically shown here as a housing 40), a shift lever 14 pivotally mounted to the base and movable between shift position locations, a sensor 16 attached to the base and operative to detect the shift position location of the shift lever 14 and to generate an electrical signal corresponding to the shift position location of the shift lever 14, a cable bracket 18 pivotally attached to the base having a cable mount 20, and a lever lock 22 operative in a first condition to releasably interlock the shift lever 14 to the cable bracket 18 for movement of the cable bracket 18 with the shift lever 14 between shift position locations, and operative in a second condition in which the shift lever 14 is movable between shift position locations independently of the cable bracket 18.

In accordance with certain preferred embodiments shown in FIGS. 1–5, a shift-by-wire shifter assembly 12 includes a housing 40, a shift lever 14 pivotally mounted to the housing and movable between shift position locations; a sensor 16 attached to the housing and operative to detect the shift position location of the shift lever 14 and to generate an electrical signal corresponding to the shift position location of the shift lever 14, a cable bracket 18 pivotally mounted in the housing 40, configured to receive the lever 14, and a sleeve 34 slidable along at least a portion of the length of the shift lever and configured to engage the shift lever to the cable bracket 18 for movement of the cable bracket with the shift lever between shift position locations. The housing 40 here refers to a base that substantially encloses the other elements of the shifter assembly. Typically the housing has spaced upper, side and end walls and a bottom having an opening. An example of such a housing can be seen in U.S. Pat. No. 5,309,783 which is herein incorporated by reference for all purposes. Other suitable housings will be apparent to one skilled in the art given the benefit of this disclosure.

In accordance with certain preferred embodiments shown in FIGS. 1–5, a shift-by-wire shifter assembly includes a base (more specifically shown as a housing 40), a yoke sub-assembly 26 comprising detents 28 corresponding to shift position locations and a pivot pin 30 for pivotally mounting the yoke sub-assembly to the base, a shift lever 14 attached to the yoke sub-assembly 26, a sensor 16 attached to the base and operative to detect the shift position location of the shift lever 14 and to generate an electrical signal corresponding to the shift position location of the shift lever 14, a cable bracket 18 pivotally mounted on the pivot pin 30 of the yoke sub-assembly 26 and having a cable mount 20, a lever lock 22 forming a sleeve 34 slidable along at least a portion of the length of the shift lever 14 and operative in a first condition to releasably interlock the shift lever 14 to the cable bracket 18 for movement of the cable bracket 18 with the shift lever 14 between shift position locations, and operative in a second condition in which the shift lever 14 is movable between shift position locations independently of the cable bracket 18; components of a brake transmission interlock system 50 including at least a BTSI lever 52 pivotally mounted on the pivot pin 30 of the yoke sub-assembly 26 and a solenoid 54 in communication with the BTSI lever 52, and a shifter knob 60 mounted on a free end of the shift lever 14 opposite of the yoke sub-assembly 26 and operative to operate the lever lock 22.

Figure 6:
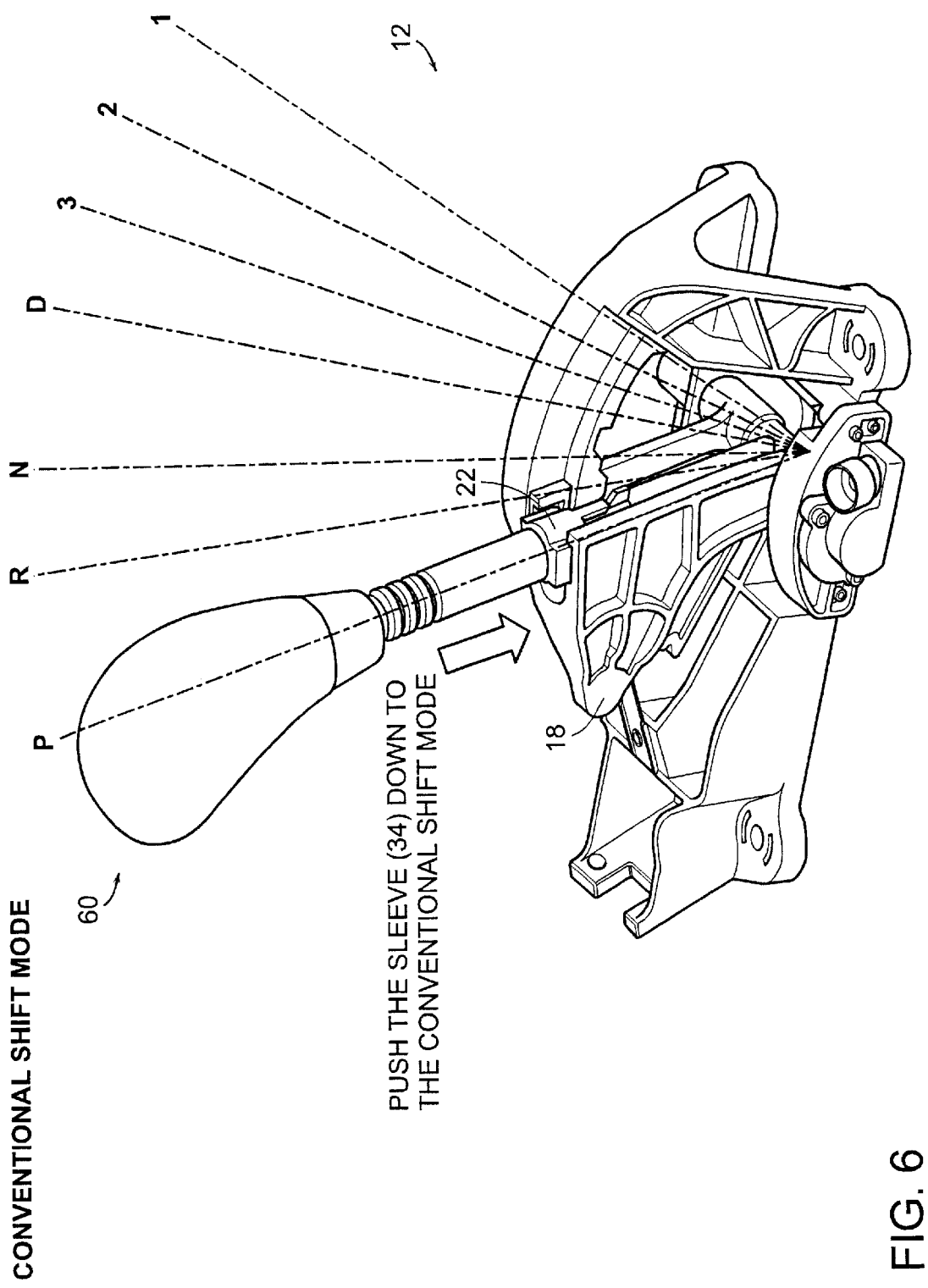
FIG. 6 is a perspective view of the shifter assembly of FIGS. 1–2, 4–5 showing how the operator engages the mechanical or conventional mode of operation of the shifter assembly in a preferred embodiment.
Figure 7:
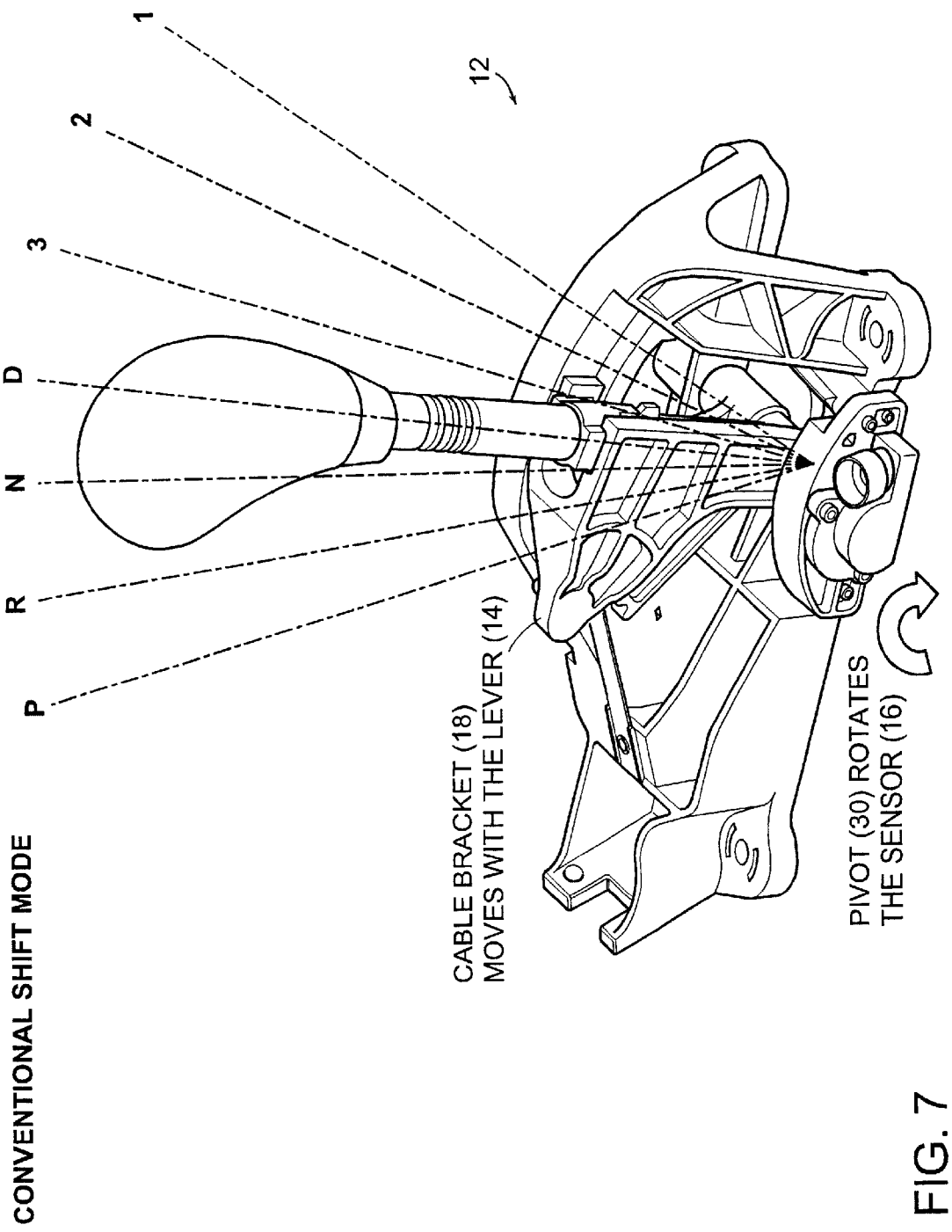
FIG. 7 is a perspective view of the shifter assembly of FIGS. 1–2, 4–5 showing the operation of the shifter assembly in mechanical or conventional shift mode.
Figure 8:
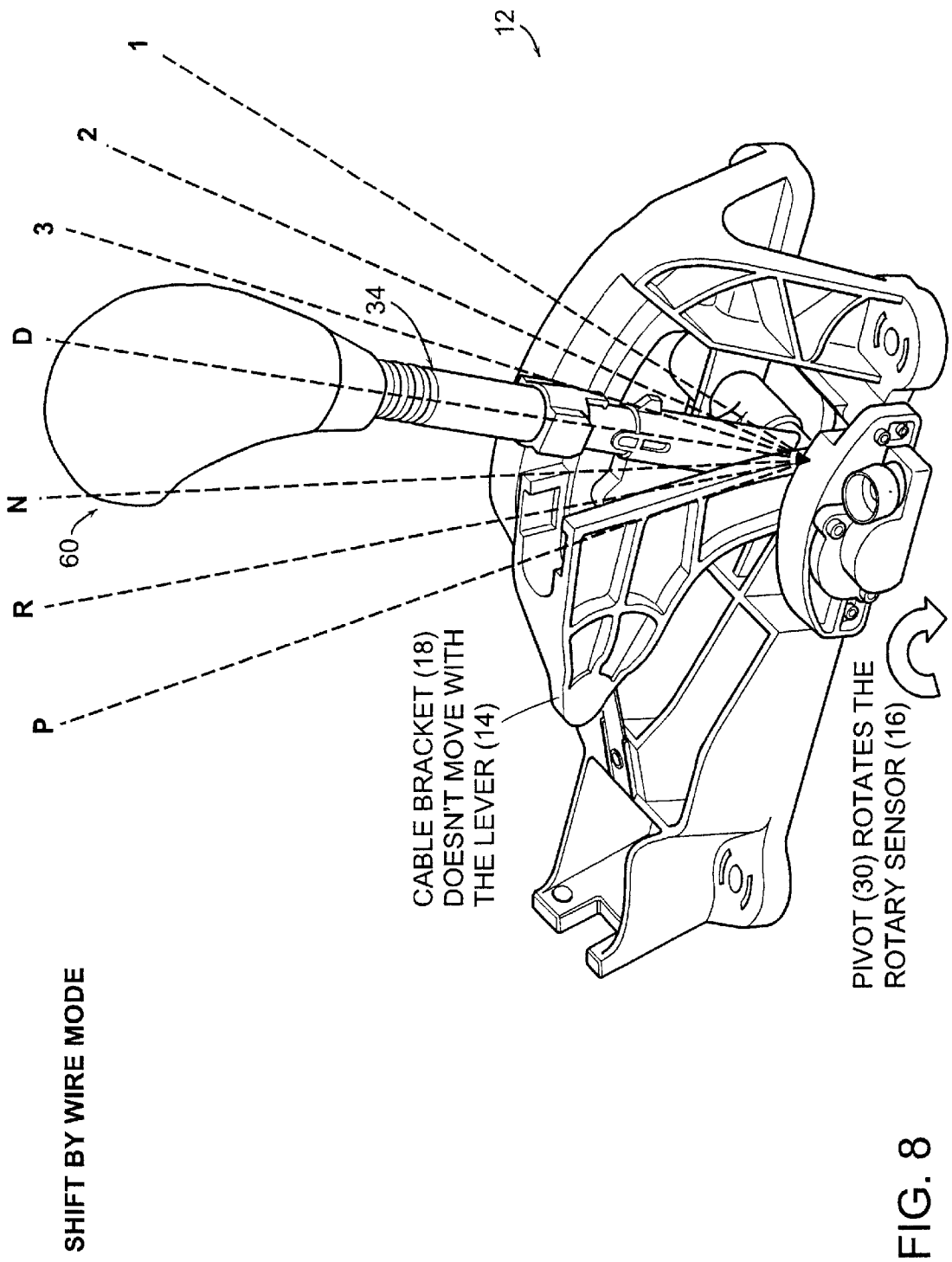
FIG. 8 is a perspective view of the shifter assembly of FIGS. 1–2, 4–5 showing the operation of the shifter assembly in electronic or shift-by-wire shift mode.

When the shifter assembly is assembled and in use there are two modes of operation that correlate to the first and second conditions of the lever lock 22 and cable bracket 18. FIG. 6 shows the engaging of the mechanical or conventional mode that corresponds to the first condition of the lever lock. In this embodiment the lever lock 22 comprises a sleeve 34 that slides along the shift lever 14 (as seen in FIG. 2). To place the lever lock 22 in the first condition and engage the mechanical override mode wherein the shifter assembly 12 actuates the transmission in a conventional manner, the operator presses down on the shifter knob 60 which in turn pushes down on the sleeve 34 which engages the cable bracket and interlocks the cable bracket 18 and the shift lever 14. In this particular embodiment the shifter assembly is designed so that the mechanical override, which places the shifter into conventional mode, can only be engaged when the shift lever is in a shift position location corresponding to P (Park). The shift lever 14 and cable bracket 18, once interlocked, move together through the shift position locations as seen in FIG. 7. In this embodiment the shift position locations correspond to conventional transmission gear positions of P (Park), R (Reverse), N (Neutral), D (Drive), 3 (Third Gear), 2 (Second Gear), and 1 (First Gear). The operator places the lever lock in the second position, wherein the electronic Shift-by-wire mode is engaged, by pulling up on the shifter knob 60 thereby sliding the sleeve up and disengaging the cable bracket. The shift lever 14 is then free to move through shift positions locations independent of the cable bracket 18 as shown in FIG. 8. The transmission shift position location of the shift lever 14 is detected by a rotary sensor 16 which generates an electronic signal corresponding to the shift position location of the shift lever 14 to actuate the transmission.

In certain embodiments it may be beneficial to be able to interchangeably shift gears in either electronic or mechanical fashion. For example shifting the transmission into Drive (D) using manual mode and then shifting to first gear (1) electronically. Other embodiments will be apparent to one skilled in the art given the benefit of this disclosure.

In certain embodiments it may be beneficial to have the shift-by-wire shifter assembly formed of just a shift lever movable between shift position locations, a cable bracket configured to interlock with the shift lever and having a cable mount, and a lever lock operative in a first condition to releasably interlock the shift lever to the cable bracket for movement of the cable bracket with the shift lever between shift position locations, and operative in a second condition in which the shift lever is movable between shift position locations independently of the cable bracket.

In another embodiments, it may be advantageous to provide a shift-by-wire shifter assembly formed of a base configured to mount the shifter assembly to an automobile chassis and having a mount for receiving a shift lever, a sensor configured to be mounted to the base and operative to detect the shift position location of a shift lever and to generate an electronic signal corresponding the levers shift position location, and a cable bracket adapted to be moveably mounted to the base, configured to interlock with the shift lever, and having a cable mount.

In another embodiment, the shift-by-wire shifter assembly may include just a base configured to mount the shifter assembly to an automobile chassis and having mounts for receiving a shift lever and a sensor, and a cable bracket adapted to be moveably mounted to the base, configured to interlock with a shift lever, and having a cable mount.

Although the present invention has been described above in terms of certain preferred embodiments, it is anticipated that other uses, alterations and modifications thereof will become apparent to those skilled in the art given the benefit of this disclosure. It is intended that the embodiments described above be interchangeable, e.g. one or more element of any of the embodiments may be interchanged with any of the elements of any other embodiment. It is also intended that the following claims be read as covering such alterations and modifications as fall within the true spirit and scope of the invention.

What is claimed is:

1. A shift-by-wire shifter assembly comprising:
   a shift lever movable between shift position locations;
   a sensor operative to detect the shift position location of the lever and to generate an electrical signal corresponding to the shift position location of the shift lever;
   a cable bracket having a transmission shift cable mount; and
   a lever lock operative in a first condition to releasably interlock the shift lever to the cable bracket for movement of the cable bracket with the shift lever between shift position locations, and having a second condition in which the shift lever is movable between shift position locations independently of the cable bracket, wherein the shift position locations in the second condition are the same as the shift position locations in the first condition.

2. The shift-by-wire shifter assembly of claim 1 wherein the shift lever is movable around a pivot.

3. The shift-by-wire shifter assembly of claim 1 further comprising a yoke sub-assembly attached to an end of the shift lever, having a series of detents and a pivot pin.

4. The shift-by-wire shifter assembly of claim 1 wherein the sensor is a rotary sensor.

5. The shift-by-wire shifter assembly of claim 1 wherein the sensor is a Hall effect sensor.

6. The shift-by-wire shifter assembly of claim 2 further comprising a pivot bearing block mounting the sensor to the pivot.

7. The shift-by-wire shifter assembly of claim 1 wherein the lever lock slidably releasably interlocks the cable bracket and the shift lever for movement together between shift position locations.

8. The shift-by-wire shifter assembly of claim 1 further comprising a base, wherein the shift lever, sensor and cable bracket of the shifter are mounted to the base.

9. The shift-by-wire shifter assembly of claim 8 wherein the base has a plurality of transmission control positions.

10. The shift-by-wire shifter assembly of claim 1 further comprising a shifter knob at a free end of the shift lever.

11. The shift-by-wire shifter assembly of claim 10 wherein the shifter knob comprises a mechanical actuator operative to transition the lever lock between the first and second conditions.

12. The shift-by-wire shifter assembly of claim 1 wherein, in the first condition of the lever lock, the sensor is inoperative to detect the shift position location of the shift lever.

13. A shift-by-wire shifter assembly comprising:
    a housing;
    a shift lever pivotally mounted to the housing and movable between shift position locations;
    a sensor attached to the housing and operative to detect the shift position location of the shift lever and to generate an electrical signal corresponding to the shift position location of the shift lever;
    a cable bracket pivotally mounted in the housing, configured to receive the shift lever; and
    a sleeve slidable along at least a portion of the length of the shift lever and configured to engage the shift lever to the cable bracket for movement of the cable bracket with the shift lever between shift position locations.

14. The shift-by-wire shifter assembly of claim 13 wherein the housing has a plurality of transmission control positions.

15. The shift-by-wire shifter assembly of claim 13 further comprising at least one component of a brake transmission interlock (BTSI) system.

16. The shift-by-wire shifter assembly of claim 15 further comprising a BTSI lever and solenoid of a brake transmission interlock system.

17. A shift-by-wire shifter assembly comprising:

a housing;

a yoke sub-assembly comprising detents corresponding to shift position locations and a pivot pin for pivotally mounting the yoke sub-assembly to the housing;

a shift lever attached to the yoke sub-assembly;

a sensor attached to the base and operative to detect the shift position location of the shift lever and to generate an electrical signal corresponding to the shift position location of the shift lever;

a cable bracket pivotally mounted on the pivot pin of the yoke sub-assembly and having a cable mount;

a lever lock comprising a sleeve slidable along at least a portion of the length of the shift lever and operative in a first condition to releasably interlock the shift lever to the cable bracket for movement of the cable bracket with the shift lever between shift position locations, and having a second condition in which the shift lever is movable between shift position locations independently of the cable bracket;

components of a brake transmission interlock system including at least a BTSI lever pivotally mounted on the pivot pin of the yoke sub-assembly and a solenoid in communication with the BTSI lever; and a shifter knob mounted on a free end of the shift lever opposite of the yoke sub-assembly and operative to operate the lever lock.

18. The shift-by-wire shifter assembly of claim 17 wherein the lever lock comprises a latch mechanism operative in an interlocking position to put the lever lock in the first condition.

19. The shift-by-wire shifter assembly of claim 17 wherein the lever lock and shift lever have corresponding surface configurations adapted to releasably interlock with each other.

20. The shift-by-wire shifter assembly of claim 17 wherein the lever lock comprises an electromagnetic lock operative to transition the lever lock from the second condition to the first condition when activated.

* * * * *